(12) United States Patent
Christoffers et al.

(10) Patent No.: US 10,673,544 B2
(45) Date of Patent: Jun. 2, 2020

(54) GENERATION OF AN RF TEST SIGNAL FOR TESTING AN RF RECEIVE CIRCUIT

(71) Applicant: Infineon Technologies AG, Neubiberg (DE)

(72) Inventors: Niels Christoffers, Vienna (AT); Vincenzo Fiore, Linz (AT); Helmut Kollmann, Linz (AT); Christian Rap, Pasching (AT); Jochen O. Schrattenecker, Reichenthal (AT); Peter Unterkircher, Plesching (AT); Christoph Wagner, Enns (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/212,883

(22) Filed: Dec. 7, 2018

(65) Prior Publication Data

US 2019/0181964 A1   Jun. 13, 2019

(30) Foreign Application Priority Data

Dec. 8, 2017 (DE) .................. 10 2017 129 330
Nov. 28, 2018 (DE) .................. 10 2018 130 088

(51) Int. Cl.
| | |
|---|---|
| *H04B 17/20* | (2015.01) |
| *H04B 1/16* | (2006.01) |
| *G01S 7/40* | (2006.01) |
| *H04B 17/19* | (2015.01) |
| *H04B 17/00* | (2015.01) |
| *H04B 17/29* | (2015.01) |
| *H04L 27/12* | (2006.01) |

(52) U.S. Cl.
CPC ............ *H04B 17/20* (2015.01); *G01S 7/4021* (2013.01); *H04B 1/16* (2013.01); *H04B 17/0085* (2013.01); *H04B 17/19* (2015.01); *H04B 17/29* (2015.01); *H04L 27/12* (2013.01)

(58) Field of Classification Search
CPC .... H04B 17/0085; H04B 17/19; H04B 17/29; H04B 1/16; H04B 17/20; H04L 27/12; G01S 7/4021
See application file for complete search history.

(56) References Cited

U.S. PATENT DOCUMENTS

| | | | |
|---|---|---|---|
| 5,133,083 A * | 7/1992 | Crilly, Jr. ............... | H04B 17/20 324/624 |
| 2014/0269993 A1* | 9/2014 | Mayer ..................... | H04L 27/12 375/303 |
| 2016/0087734 A1 | 3/2016 | Kordik et al. | |
| 2017/0082756 A1 | 3/2017 | Parikh et al. | |
| 2017/0111111 A1* | 4/2017 | Urban ................ | H04B 10/0775 |
| 2018/0219636 A1* | 8/2018 | Gale ...................... | H04B 17/20 |

FOREIGN PATENT DOCUMENTS

DE   102015115017 A1   3/2016

* cited by examiner

*Primary Examiner* — Thanh C Le
(74) *Attorney, Agent, or Firm* — Harrity & Harrity, LLP (57) ABSTRACT

The description is of a circuit which, according to one example embodiment, comprises the following: an input circuit node for receiving an RF oscillator signal; a test signal generator circuit, which comprises at least one modulator and which is embodied to generate an RF test signal by modulating the RF oscillator signal. Further, the circuit comprises at least one receive channel with a receiver circuit and a coupler, which is embodied to feed the RF test signal into the receiver circuit.

24 Claims, 6 Drawing Sheets

GENERATION OF AN RF TEST SIGNAL FOR TESTING AN RF RECEIVE CIRCUIT

RELATED APPLICATION

This application claims priority under 35 U.S.C. § 119 to German Patent Application No. 102017129330.2, filed on Dec. 8, 2017, and German Patent Application No. 102018130088.3, filed on Nov. 28, 2018, the contents of which are incorporated by reference herein in their entirety.

TECHNICAL FIELD

The present description relates to the field of radiofrequency (RF) circuits. Some example embodiments relate to a monolithic microwave integrated circuit (MMIC) with a circuit for generating test signals, which facilitates the testing of an RF receive circuit contained in the MMIC.

BACKGROUND

Radiofrequency (RF) transmitters and receivers are found in a multiplicity of applications, particularly in the field of wireless communication and in the field of radar sensors. In the automotive sector, there is an increasing demand for radar sensors which can be used, inter alia, in driver assistance systems (advanced driver assistance systems, ADAS) such as adaptive cruise control (ACC or radar cruise control) systems, for example. Such systems are able to automatically adapt the speed of an automobile in order thus to maintain a safe distance from other automobiles driving ahead (and from other objects and pedestrians). Further applications in the automotive sector are, for example, blind spot detection, lane change assist and the like.

Modern radar systems use highly integrated RF circuits which can unify all core functions of an RF front end of a radar transceiver in a single housing (single chip radio transceiver). Such highly integrated RF circuits are usually referred to as monolithic microwave integrated circuits (MMICs). An RF front end typically (but not necessarily) contains, inter alia, a phase-control-loop-switched voltage-controlled oscillator (VCO), power amplifiers (PAs), directional couplers, mixers and associated control circuit arrangements for controlling and monitoring the RF front end. An MMIC may also comprise circuits for analog signal processing in the baseband (or in an intermediate frequency band) and analog-to-digital converters (ADCs) in order to facilitate digital signal processing. Depending on application, digitally controlled oscillators (DCOs) may also be used instead of VCOs.

Testing one or more RF circuit components is often desired or necessary in sensor applications in order to facilitate a fault-free operation of the sensors and observance of the desired measurement accuracy. For this reason, RF circuits used in radar sensors may comprise components that facilitate one or more tests/self-tests in order to test and/or characterize certain RF circuit components.

SUMMARY

A circuit is described which, according to one example embodiment, comprises the following: an input circuit node for receiving an RF oscillator signal; a test signal generator circuit, which comprises at least one modulator and which is embodied to generate an RF test signal by modulating an RF oscillator signal. Further, the circuit comprises at least one receive channel with a receiver circuit and a coupler, which is embodied to feed the RF test signal into the receiver circuit.

According to a further example embodiment, the circuit comprises the following: an input circuit node for receiving an RF oscillator signal; a first modulator, which is embodied to generate a first RF signal by virtue of the RF oscillator signal being modulated with a first signal; a second modulator, which is embodied to generate a second RF signal by virtue of the RF oscillator signal being modulated with a second signal. Further, the circuit comprises an RF combiner circuit, which is embodied to generate an RF test signal by combining the first RF signal and the second RF signal.

Furthermore, an RF receive apparatus is described. According to one example embodiment, the RF receive apparatus comprises the following: an antenna input for connecting an antenna; an RF signal source, embodied to provide an RF oscillator signal; a circuit for generating an RF test signal; a receive mixer, which has an RF input and an output; and a coupler, which is connected to the antenna input, an output of the circuit for generating the RF test signal and the RF input of the receive mixer and which is embodied to transmit the RF test signal to the RF input of the receive mixer. Here, the circuit for generating the RF test signal comprises: an input circuit node, which is coupled with the RF signal source in order to receive the RF oscillator signal, a first modulator, which is embodied to generate a first RF signal by virtue of the RF oscillator signal being modulated with a first signal, and a second modulator, which is embodied to generate a second RF signal by virtue of the RF oscillator signal being modulated with a second signal. An RF combiner circuit is embodied to generate an RF test signal by combining the first RF signal and the second RF signal.

Moreover, a method is described which, according to one example embodiment, includes the following: generating an RF test signal by modulating a plurality of modulation signals onto a radiofrequency signal and feeding the RF test signal into at least one RF circuit.

According to a further example embodiment, the method includes generating a first RF signal by modulating an RF oscillator signal with a first signal and generating a second RF signal by modulating the RF oscillator signal with a second signal. Further, the method includes generating an RF test signal by combining the first RF signal and the second RF signal.

BRIEF DESCRIPTION OF THE DRAWINGS

Example embodiments are described in more detail below on the basis of drawings. The illustrations are not necessarily true to scale and the example embodiments are not restricted to the illustrated aspects only. Rather, importance is placed on illustrating the principles underlying the example embodiments. In the drawings.

DETAILED DESCRIPTION

The example embodiments described herein are described in the context of a radar receiver or transceiver. The various example embodiments described herein, however, are not restricted to radar applications and can also be used in other fields, for example in RF transceivers of RF communications apparatuses.

Figure 1:
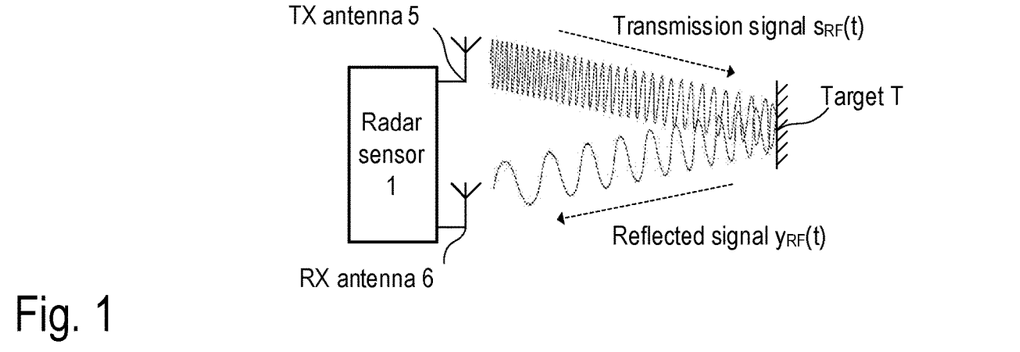
FIG. 1 is a sketch for illustrating the functional principle of an FMCW radar system for measuring distance and/or speed.

FIG. 1 illustrates the application of an FMCW radar system as a sensor for measuring distances and speeds of objects, which are usually referred to as radar targets. In the present example, the radar apparatus 10 comprises separate transmit (TX) and receive (RX) antennas 5 and 6 (bistatic or pseudo-monostatic radar configuration). However, it should be noted that use can also be made of a single antenna, which serves as a transmit antenna and as a receive antenna at the same time (monostatic radar configuration). The transmit antenna 5 emits a continuous RF signal $s_{RF}(t)$, which is frequency modulated with a linear chirp signal (periodic, linear frequency ramp), for example. The emitted signal $s_{RF}(t)$ is scattered back at the radar target T and the scattered back (reflected) signal $y_{RF}(t)$ is received by the receive antenna 6.

Figure 2:
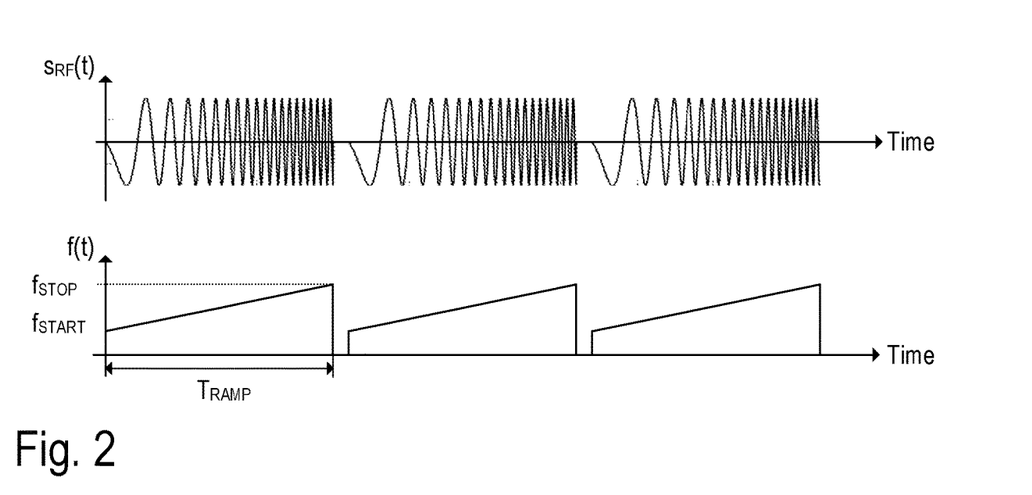
FIG. 2 comprises two timing diagrams for illustrating the frequency modulation of the RF signal generated by the FMCW system.

FIG. 2 illustrates, as an example, the aforementioned frequency modulation of the signal $s_{RF}(t)$. As illustrated in FIG. 2, the signal $s_{RF}(t)$ is composed of a set of "chirps"; i.e., the signal $s_{RF}(t)$ comprises a sequence of sinusoidal wave forms with rising (up chirp) or falling (down chirp) frequency (see the upper diagram in FIG. 2). In the present example, the current frequency f(t) of a chirp starting at a start frequency $f_{START}$ increases linearly within a time interval $T_{RAMP}$ to a stop frequency $f_{STOP}$ (see the lower diagram in FIG. 2). Such chirps are also referred to as a linear frequency ramp. FIG. 2 illustrates three identical linear frequency ramps. However, it should be noted that the parameters $f_{START}$, $f_{STOP}$, $T_{RAMP}$ and the pause between the individual frequency ramps may vary. Additionally, the frequency variation need not necessarily be linear. Depending on the implementation, use can also be made of, for example, transmission signals with an exponential frequency variation (exponential chirps) or a hyperbolic frequency variation (hyperbolic chirps).

Figure 3:
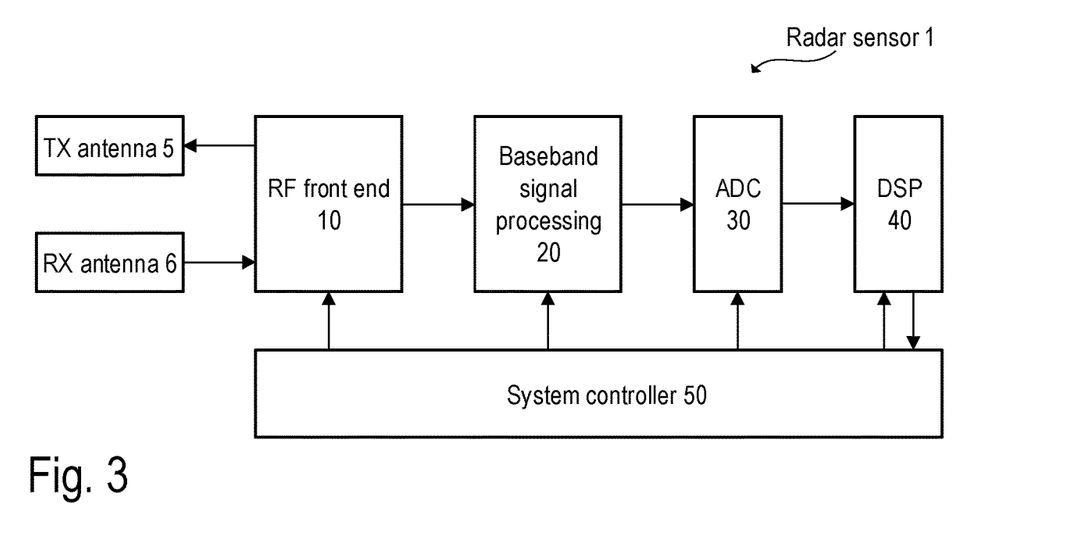
FIG. 3 is a block diagram for illustrating the basic structure of an FMCW radar system.

FIG. 3 is a block diagram which illustrates a possible structure of a radar apparatus 1 (radar sensor) as an example. By way of example, similar structures can also be found in RF transceivers, which are used in other applications such as wireless communications system, for example. Accordingly, at least one transmit antenna 5 (TX antenna) and at least one receive antenna 6 (RX antenna) are connected to an RF front end 10, which may contain all the circuit components that are required for RF signal processing. By way of example, these circuit components comprise a local oscillator (LO), RF power amplifiers, low-noise amplifiers (LNAs), directional couplers (e.g., rat race couplers, circulators, etc.) and mixers for down-mixing the RF signals into the baseband or into an intermediate frequency band (IF band). The RF front end 10 can be integrated—optionally together with further circuit components—in a monolithic microwave integrated circuit (MMIC). The illustrated example shows a bistatic (or pseudo-monostatic) radar system with separate RX and TX antennas. A single antenna would be used both for emitting and receiving the electromagnetic (radar) signals in the case of a monostatic radar system. In this case, a directional coupler (e.g., a circulator) can be used to separate the RF signals to be emitted in the radar channel from the RF signals (radar echoes) received from the radar channel. In practice, radar systems usually have a plurality of transmit and receive channels with a plurality of transmit and/or receive antennas, which, inter alia, facilitates a measurement of the direction from which the radar echoes are received (DoA, direction of arrival).

In the case of a frequency-modulated continuous wave radar system (FMCW radar system), the RF signals emitted by the TX antenna 5 may lie in a range from approximately 20 GHz to 100 GHz (e.g., approximately 77 GHz in some applications), for example. As mentioned, the RF signal received by the RX antenna 6 comprises the radar echoes, i.e., those signal components that are scattered back at one or more radar targets. By way of example, the received RF signal $y_{RF}(t)$ is downmixed into the baseband and processed further in the baseband by means of analog signal processing (see FIG. 3; analog baseband signal processing chain 20). In essence, the aforementioned analog signal processing comprises filtering and, optionally, an amplification of the baseband signal. The baseband signal is finally digitized (see FIG. 3; analog-to-digital converter 30) and processed further in the digital domain. The digital signal processing chain can be realized at least in part as software, which can be run on a processor, for example a microcontroller or a digital signal processor (see FIG. 3; DSP 40). As a rule, the overall system is controlled by means of a system controller 50, which may likewise be implemented at least in part as software, which can be run on a processor such as a microcontroller, for example. The RF front end 10 and the analog baseband signal processing chain 20 (optionally, the analog-to-digital converter 30, too) may be integrated together in a single MMIC (i.e., an RF semiconductor chip). Alternatively, the individual components may also be distributed among a plurality of integrated circuits.

Figure 4:
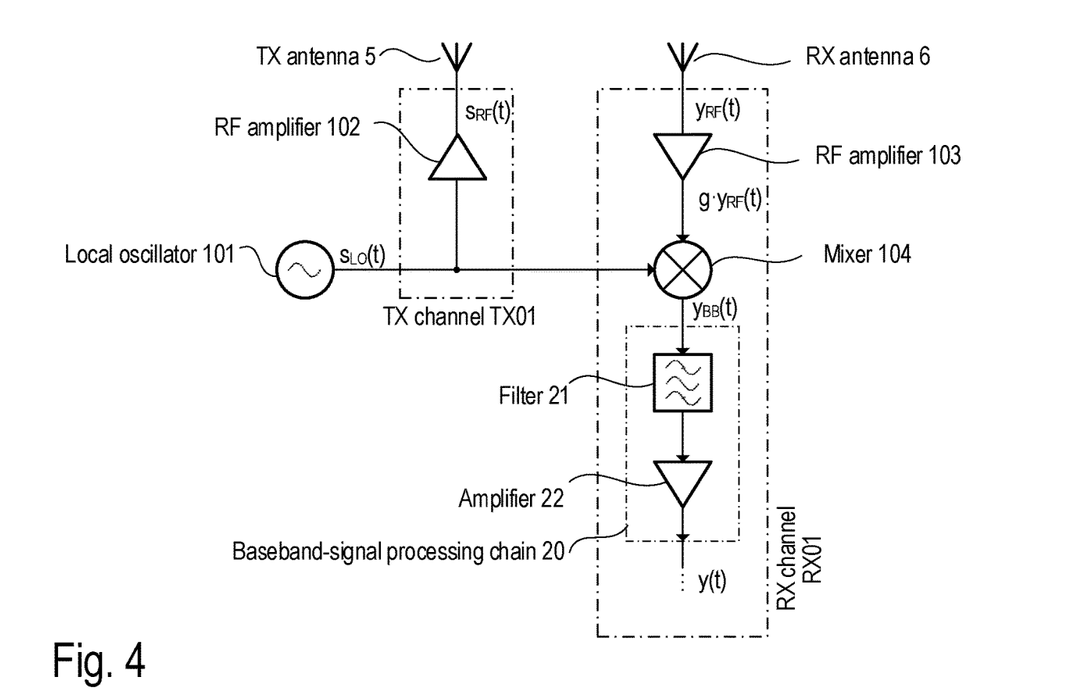
FIG. 4 is a block diagram for illustrating an example implementation of a transmit channel and a receive channel of a radar system.

FIG. 4 illustrates an example implementation of the RF front end 10 with a downstream baseband signal processing chain 20, which may be part of the radar sensor of FIG. 3. It should be noted that FIG. 4 illustrates simplified circuitry in order to show the basic structure of the RF front end with one transmit channel (TX channel TX01) and one receive channel (RX channel RX01). Naturally, actual implementations, which may depend strongly on the specific application, may be more complex and may typically have a plurality of TX and/or RX channels. The RF front end 10 comprises a local oscillator 101 (LO), which generates an RF oscillator signal $s_{LO}(t)$. The RF oscillator signal $s_{LO}(t)$ may be frequency modulated, as described above with reference to FIG. 2, and it is also referred to as an LO signal. In radar applications, the LO signal usually lies in the SHF (super high frequency, centimeter wavelength) or EHF (extremely high frequency, millimeter wavelength) band, for example in the interval from 76 GHz to 81 GHz in some automotive applications.

The LO signal $s_{LO}(t)$ is processed both in the transmit signal path (in the TX channel) and in the receive signal path (in the RX channel). The transmission signal $s_{RF}(t)$ (see FIG. 2), which is emitted by the TX antenna 5, is generated by amplifying the LO signal $s_{LO}(t)$, for example by means of the RF power amplifier 102, and it is therefore only an amplified version of the LO signal $s_{LO}(t)$. The output of the amplifier 102 can be coupled to the TX antenna 5 (in the case of a bistatic or pseudo-monostatic radar configuration). The receive signal $y_{RF}(t)$, which is received by the RX antenna 6, is fed to the receiver circuit in the RX channel and hence, either directly or indirectly, to the RF port of the mixer 104. In essence, the receive signal path (the RX channel) comprises a heterodyne receiver. In the present example, the RF receive signal $y_{RF}(t)$ (antenna signal) is pre-amplified by means of the amplifier 103 (gain g). Thus, the amplified RF receive signal $g \cdot y_{RF}(t)$ is fed to the mixer 104. By way of example, the amplifier 103 can be an LNA. The LO signal $s_{LO}(t)$ is fed to the reference port of the mixer 104, and so the mixer 104 downmixes the (pre-amplified) RF receive signal $y_{RF}(t)$ into the baseband. The downmixed baseband signal (mixer output signal) is denoted $y_{BB}(t)$. This baseband signal $y_{BB}(t)$ is initially processed further in analog, wherein the analog baseband signal processing chain 20 may substantially comprise an amplification (amplifier 22) and filtering (e.g., band pass filter 21) in order to suppress unwanted sidebands and image frequencies. The resulting analog output signal, which can be fed to an analog-to-digital converter (see FIG. 3; ADC 30), is denoted by y(t). Methods for digital further processing of the output signal (digital radar signal) are known per se (for example, the range-Doppler analysis) and are therefore not discussed in any more detail here.

In the present example, the mixer 104 downmixes the pre-amplified RF receive signal $g \cdot y_{RF}(t)$ (i.e., the amplified antenna signal) into the baseband. Mixing can be implemented in one stage (i.e., directly into the baseband from the RF band) or via one or more intermediate stages (i.e., from the RF band into an intermediate frequency band and onward into the baseband). In this case, the receive mixer 104 effectively comprises a plurality of series-connected individual mixer stages. In view of the example shown in FIG. 4, it becomes clear that the quality of a radar measurement depends strongly on the quality of the LO signal $s_{LO}(t)$ and on the linearity of the circuit components arranged in the receive signal path. By way of example, the linearity of the receive mixer 104 is a relevant parameter.

A nonlinearity of the receive mixer 104 leads to an intermodulation distortion of the radar signals. The linearity (or nonlinearity) of a circuit component such as the receive mixer 104, for example, can be quantitavely characterized by measuring properties (amplitude, power, etc.) of intermodulation products (IMPs). By way of example, if the power of IMPs lies below a specifiable threshold, the tested circuit component (or the tested signal path) may be considered to be sufficiently linear (for the respective application). In radar applications, distortions as a result of intermodulation, which cause IMPs, may adversely affect the measurement result and lead to the deterioration in the accuracy and reliability of the radar measurements. An MMIC may contain circuit components for the purpose of characterizing the linearity of the receive channels, said circuit components allowing information items about the linearity to be established in a test and/or a self-test. By way of example, such a test can be a so-called end-of-line test (EOL test) or a self-test, which is carried out during the operation of the MMIC.

Figure 5:
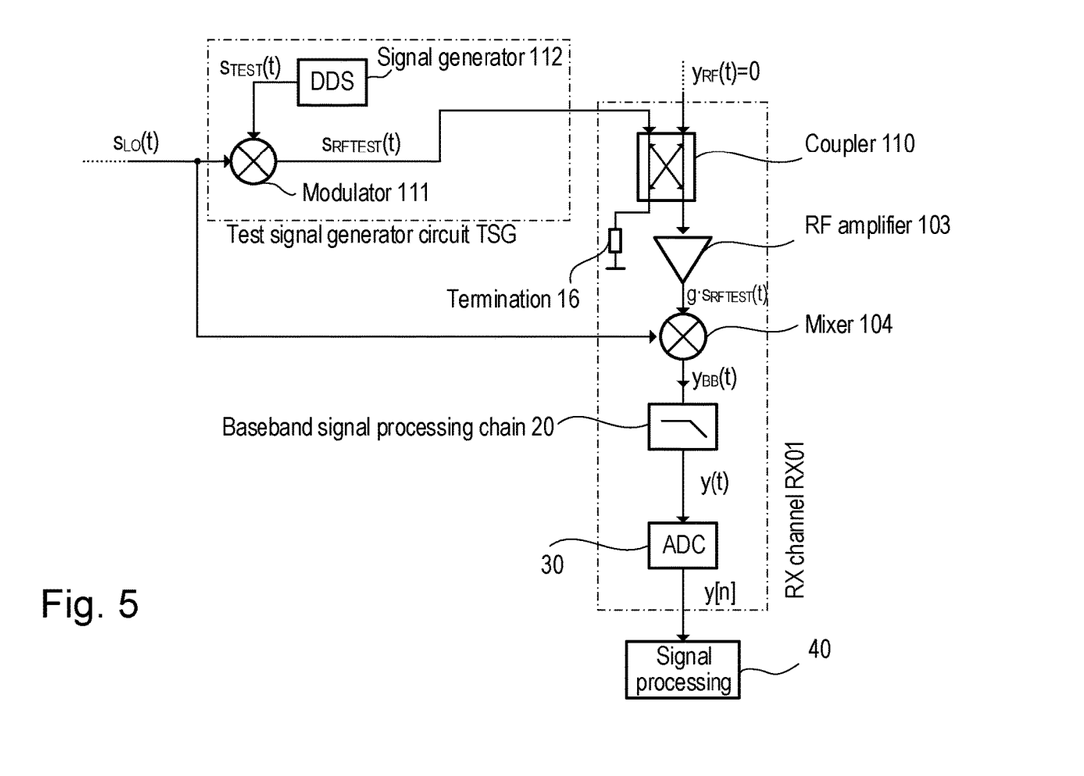
FIG. 5 is a block diagram for illustrating an example of a receive channel of a radar system with an additional RF test signal generator circuit, which facilitates testing of the receiver circuit contained in the RF front end.

FIG. 5 is a block diagram which shows a receiver circuit of a receive channel RX01 of an RF transceiver, which is similar to the example of FIG. 4 but has additional circuits that facilitate the aforementioned tests. An RF input signal $y_{RF}(t)$ is fed to the RF receiver circuit, said RF input signal having been received by means of an antenna (not illustrated), for example. During a test, this signal can be zero ($y_{RF}(t)=0V$), leading to a disturbance-free operation. The RF input signal $y_{RF}(t)$ is transmitted to the mixer 104 by the directional coupler 110. Like in the example of FIG. 1, the RF input signal $y_{RF}(t)$ can be pre-amplified, wherein the amplifier 103 may be disposed upstream or downstream of the directional coupler 110. In the present example, the amplifier 103 is connected between the directional coupler 110 and the mixer 104. The signal processing chain following the mixer 104 is the same as the one in the example according to FIG. 4. Accordingly, the output of the mixer 104 is coupled to the input of the analog baseband signal processing chain 20, which, in particular, suppresses unwanted sidebands and image frequencies in the output signal of the mixer 104. The output of the analog baseband signal processing chain 20 is coupled to an analog input of the analog-to-digital converter 30, the latter being embodied to digitize the pre-processed baseband signal y(t). The digital representation of the pre-processed baseband signal y(t) is denoted by y[n] and the latter can be processed further by means of the signal processor 40. The signal processing chain from the directional coupler 110 to the analog-to-digital converter 30 is also referred to as receiver circuit or receive channel. As mentioned, real radar systems have a plurality of receive channels, as a rule.

The directional coupler 110 allows an RF test signal $s_{RFTEST}(t)$ to be coupled into the receive signal path of the RX channel RX01, as a result of which the RF test signal $s_{RFTEST}(t)$ is fed to the RF port of the mixer 104 (e.g., as an alternative to the input signal $y_{RF}(t)$). The RF test signal $s_{RFTEST}(t)$ can be pre-amplified by means of the amplifier 103, like the RF input signal $y_{RF}(t)$. The directional coupler 110 can be a ring coupler implemented by means of strip lines, for example. As is conventional for such couplers, one port is terminated by means of a terminating impedance 16. Alternatively, the coupler 110 can be a passive or active circulator. Other types of couplers can also be used. As mentioned, the receive mixer 104 may also be constructed from a series connection of a plurality of mixer stages.

In essence, the RF test signal $s_{RFTEST}(t)$ is "injected" into the receive signal path of the RX channel RX01 and the mixer 104 consequently "sees" the RF test signal $s_{RFTEST}(t)$ like a regular RF input signal. Therefore, the RF test signal $s_{RFTEST}(t)$ may also be referred to as a "virtual radar echo". In the illustrated example, the RF test signal $s_{RFTEST}(t)$ is generated by a test signal generator circuit TSG. The latter contains a modulator 111, which modulates the LO signal $s_{LO}(t)$ (e.g., generated by a local oscillator in the chip or supplied by an external pin), which has a carrier frequency $f_{LO}$, with a test signal $s_{TEST}(t)$ (modulation signal). The test signal $s_{TEST}(t)$ can be a single-tone signal, for example, which has only a single frequency $f_{TEST}$. In practice, a single-tone signal is a very narrowband signal, which substantially has only one spectral line (frequency bin). In general, a "tone" is understood to mean a sinusoidal curve, which has a certain frequency and a phase. A plurality of tones can be superposed and form an N-tone signal, where N denotes the number of tones. In the example embodiments described here, narrowband modulation signals may also be used instead of single-tone signals, the frequency bands of said narrowband modulation signals not overlapping. In this context, narrowband means that the modulation signals have a defined bandwidth greater than zero and consequently comprise more than one single-tone. The spectrum of the modulation signals may be continuous (within the considered frequency band) or consist of a plurality of discrete frequencies.

Under ideal conditions, the baseband signal y(t), and hence the digital radar signal y[n], too, would have to be a single-tone signal again; the mixer 104 effects a demodulation, which reverses the modulation effected by the modulator 111 again. However, a (small) nonlinearity in the receive signal path (e.g., in the mixer 104) leads to a harmonic distortion and, in addition to the frequency $f_{TEST}$, the digital radar signal y[n] will also have higher harmonics, i.e., integer multiples of the frequency $f_{TEST}$. Two-tone signals or, in general, N-tone signals, which have two or more frequencies or spectral lines, are required for some tests. In particular, this is the case if it is not only the function of the receive signal path (receiver circuit of an RX channel) that is tested but if the linearity/nonlinearity thereof should be determined quantitatively. If the test signal contains two or more tones (sinusoidal curves), the aforementioned distortions also arise as a result of intermodulation in addition to the harmonic distortion, which distortions as a result of intermodulation will still be discussed in more detail below (see FIG. 6). The test signal $s_{TEST}$ (modulation signal) can be generated by means of a direct digital synthesizer (DDS), for example, the latter being a type of frequency synthesizer that can be used to generate any signal curve. Other types of signal sources may also be used. By way of example, in the case of an EOL test, the test signal $s_{TEST}(t)$ can also be generated by an external apparatus (e.g., an automatic test device, ATE) instead of using a DDS and said test signal can be fed to the MMIC via an external pin or a test pad. Only the modulator 111 of the test signal generator circuit TSG is required in this case.

The test signal generator circuit TSG illustrated in FIG. 5 is suitable for testing the function of the circuit components arranged in an RX channel. The test can be repeated for several or all RX channels of a radar system. As explained below on the basis of FIG. 6, the test signal generator circuit TSG illustrated in FIG. 5 is not readily suitable for qualitatively capturing the linearity of the receiver circuit of an RX channel, i.e., for measuring the distortions caused by nonlinearities. By way of example, a possible measurement value for the linearity would be the ratio of the power of all intermodulation products (IMPs) to the power of the test signal $s_{TEST}(t)$. For a quantitative characterization of the linearity, the RF test signal $s_{RFTEST}(t)$ should be a high quality two-tone signal or N-tone signal (frequency shifted by the carrier frequency $f_{LO}$). However, even in the (theoretical) case where the signal $s_{TEST}(t)$ is a perfect two-tone signal, the RF test signal $s_{RFTEST}(t)$ may already contain IMPs and harmonics and it is no longer possible to make a distinction during the measurement as to whether the IMPs contained in the analog and digital radar signal y(t) and y[n], respectively, are generated by the modulator 111 or the receive mixer 104. Thus, the modulator 111 should have a comparatively high linearity. Since the linearity of the modulator 111 in a realistic implementation in an MMIC is usually not significantly better than the linearity of the receive mixer 104, the simple test signal generator circuit TSG of FIG. 5 is not readily suitable for a quantitative characterization of the linearity of an RF receiver circuit integrated in an MMIC.

Figure 6:
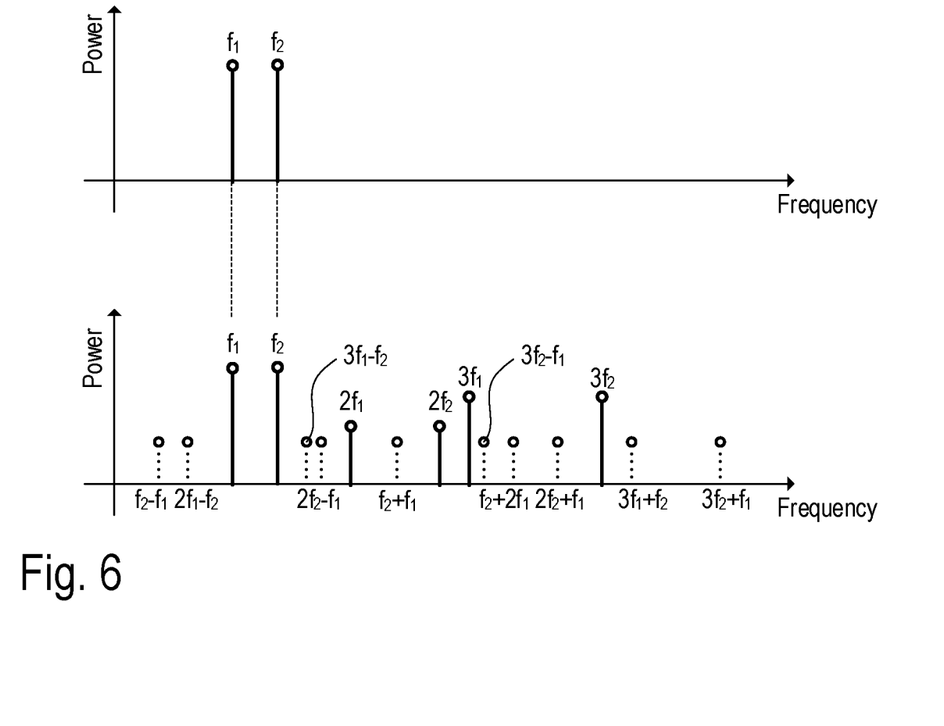
FIG. 6 illustrates spectra of single-tone signals and two-tone signals, which occur as test signals in the example of FIG. 5, as an example.

On the basis of example spectra, FIG. 6 illustrates the detection of IMPs in the output signal of a receiver circuit (analog or digital radar signal y(t) and y[n], respectively) and the determination of the power of the IMPs. As an example, the top diagram in FIG. 6 illustrates the spectrum of a two-tone signal as an example of a test signal $s_{TEST}(t)$; the spectrum substantially comprises two spectral lines, one at the frequency $f_1$ and one at the frequency $f_2$. As explained above, this test signal $s_{TEST}(t)$ is transformed into the RF range by the modulator 111 (see FIG. 5) and the resultant RF test signal $s_{RFTEST}(t)$ is fed to a receive channel (see FIG. 5; RX channel RX01) and mixed back into the baseband there by means of the receive mixer 104. The spectrum of the resultant output signal y[n] of the receive channel is illustrated in the bottom diagram in FIG. 6 as an example. Accordingly, the spectrum of the resultant baseband signal likewise contains the two spectral lines at the frequencies $f_1$ and $f_2$; however, it additionally also contains further spectral lines of the higher harmonics and the intermodulation products (IMPs). As mentioned above, more or less narrowband modulation signals, which have non-overlapping frequency bands (e.g., with $f_1$ and $f_2$ as mid-frequencies) with a finite bandwidth, can also be used instead of the single-tone signals at the frequencies $f_1$ and $f_2$.

The additional spectral lines on account of harmonic distortions lie at integer multiples of the frequencies $f_1$ and $f_2$, i.e., at $m \cdot f_1$ and $n \cdot f_2$ (m,n=2, 3, 4, . . . ). The additional spectral lines of the IMPs lie at the sums of integer multiples of the frequencies $f_1$ and $f_2$, i.e. at $k \cdot f_1 + l \cdot f_2$ (k=±1, ±2, ±3, . . . , and l=±1, ±2, ±3, . . . ). Since the factors k and l can also be negative, the aforementioned sums also comprise the differences of integer multiples of the frequencies $f_1$ and $f_2$. The power of the spectral lines at the frequencies $k \cdot f_1 + l \cdot f_2$ in relation to the power of the two-tone signal (the top diagram in FIG. 6) can be used as a measure for the linearity of the receiver circuit of the respective receive channel, with the linearity increasing with smaller powers of the intermodulation products and the higher harmonics.

Thus, the power of the intermodulation products can be used as a measure for the linearity. However, in the example illustrated in FIG. 5, there is a problem in that the two-tone test signal $s_{TEST}(t)$ is transformed into the RF range by virtue of the LO signal $s_{LO}(t)$ being modulated with the test signal $s_{TEST}(t)$ (see FIG. 5; modulator 111). However, the modulator 111 itself causes IMPs and therefore it is no longer possible to clearly determine on the basis of the measured spectrum (see the bottom diagram in FIG. 6) whether the IMPs are in fact caused by the receiver circuit (e.g., the mixer 104) or were already caused by the modulator 111. Although it is possible to use the circuit from FIG. 5 to test the function of the receiver circuit in the RX channel RX01 per se, it is not, for this reason, suitable for a quantitative determination of the linearity of the receiver circuit (of the mixer 104). A high-quality RF test signal $s_{RFTEST}(t)$ without IMPs such that the IMPs detected in the spectrum can be clearly ascribed to the receiver circuit would be necessary for a quantitative determination.

Figure 7:
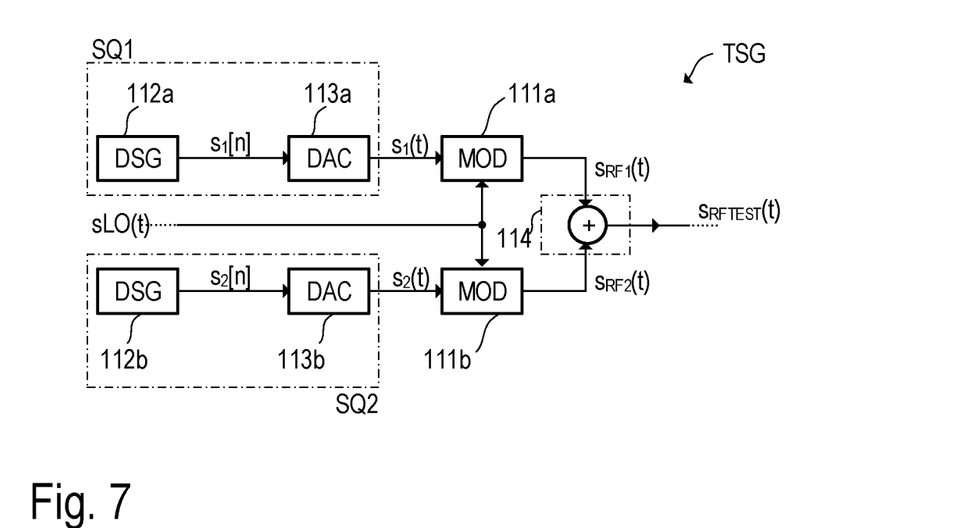
FIG. 7 is a block diagram of an example embodiment of an improved test signal generator circuit, which can be used in the example of FIG. 5.

FIG. 7 shows an example of an improved test signal generator circuit TSG, which can be used in an MMIC instead of the circuit, shown in FIG. 5, for generating an RF test signal. As illustrated in FIG. 7, the test signal generator circuit TSG may comprise two signal sources SQ1, SQ2, the output signals of which are denoted by $s_1(t)$ and $s_2(t)$. It is also possible to provide more than two signal sources if an N-tone signal should be generated instead of a two-tone signal. In the illustrated example, the signal sources SQ1 and SQ2 are arranged in the same MMIC as the RX channel RX01. However, for an EOL test, the signals $s_1(t)$ and $s_2(t)$ may also be generated in an external test device and fed into the MMIC via pins or test pads.

In the example illustrated in FIG. 7, the signal sources SQ1 and SQ2 each comprise a digital signal generator (DSG) 112a and 112b and an analog-to-digital converter 113a, 113b. The output signal of the first signal generator 112a is denoted by $s_1[n]$ and the output signal of the second signal generator 112b is denoted by $s_2[n]$. The digital signals $s_1[n]$ and $s_2[n]$ are converted into the analog signals $s_1(t)$ and $s_2(t)$ by the analog-to-digital converters 113a and 113b, which are available at the outputs of the signal sources SQ1 and SQ2. As an alternative thereto, an analog signal generation is also possible. Independently of the implementation of the signal sources SQ1 and SQ2, the output signals of the two (or more) signal sources SQ1 and SQ2 are each single-tone signals, which differ in terms of their frequency or in terms of their phase (or in terms of frequency and phase).

The test signal generator circuit TSG has a modulator for each signal source SQ1 and SQ2. In the case of two single-tone signals $s_1(t)$ and $s_2(t)$, a first modulator 111a is disposed downstream of the first signal source SQ1 and a second modulator 111b is disposed downstream of the second signal source SQ2. More than two modulators are correspondingly provided in the case of examples with more than two signal sources. The modulators 111a and 111b are embodied to modulate an RF oscillator signal, such as the LO signal $s_{LO}(t)$, for example, with the output signals $s_1(t)$ and $s_2(t)$ of the signal sources SQ1 and SQ2. The resultant modulated RF signals are denoted by $s_{RF1}(t)$ and $s_{RF2}(t)$. The two RF signals $s_{RF1}(t)$ and $s_{RF2}(t)$ are fed to an RF combiner circuit 114, which may be implemented as a Wilkinson power combiner, for example. Other active or passive implementations of the RF combiner circuit 114 are possible. According to one example embodiment, the RF combiner circuit 114 is embodied to provide a linear combination of the two RF signals $s_{RF1}(t)$ and $s_{RF2}(t)$ at its output as an RF test signal $s_{RFTEST}(t)$. In this case, the RF test signal $s_{RFTEST}(t)$ would be equal to $g_1 \cdot s_{RF1}(t) + g_2 \cdot s_{RF2}(t)$, with the factors $g_1$ and $g_2$ denoting gains which, as a rule, are equal ($g_1=g_2$) and may also be less than one.

Unlike in the example of FIG. 5, two modulators are used for generating an RF test signal modulated with a two-tone signal, said two modulators each modulating the RF oscillator signal $s_{LO}(t)$ with a single-tone signal (signals $s_1(t)$ and $s_2(t)$). N-modulators will be used in the case of an N-tone signal in order to generate N RF signals, each modulated with a single-tone signal. The use of a plurality of modulators, which each have a single-tone signal supplied as a modulation signal, has the effect of harmonic distortions, but not intermodulation distortions, occurring in the modulators. However, even if, for example, only two two-tone signals and two modulators are used instead of four single-tone signals and four modulators for the purposes of modulating the RF oscillator signal with four tones, an improvement (a reduction in the IMPs) can be obtained in relation to the case in which only one modulator is used. However, if IMPs nevertheless occur in the spectrum of the output signal to be determined (see, e.g., FIG. 5; signal $y[n]$), these can be uniquely assigned to the receiver circuit of the respective receive channel, in particular to the respective receive mixer.

Figure 8:
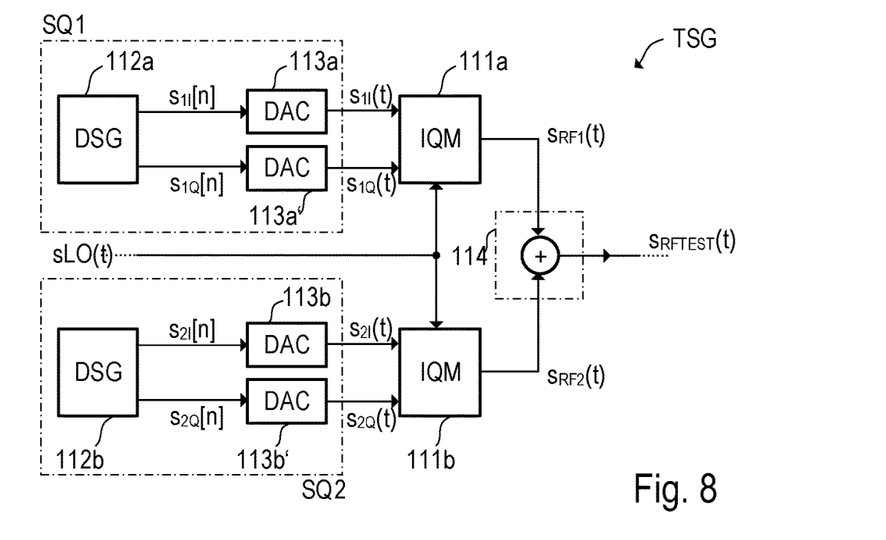
FIG. 8 illustrates an example implementation of the example embodiment of FIG. 7.

FIG. 8 shows a further example of an improved test signal generator circuit TSG. In the illustrated example, the signals $s_1(t)$ and $s_2(t)$ generated by the signal sources SQ1 and SQ2 are complex-valued signals. That is to say, $s_1(t)=s_{11}(t)+j \cdot s_{Q1}(t)$ and $s_2(t)=s_{12}(t)+j \cdot s_{Q2}(t)$, where the signal components $s_{11}(t)$ and $s_{12}(t)$ are referred to as in-phase components (in-phase signals) and the signal components $s_{Q1}(t)$ and $s_{Q2}(t)$ are referred to as quadrature components (quadrature signals) (j denotes the imaginary unit). In this case, too, the signals $s_1(t)$ and $s_2(t)$ are single-tone signals and, in general, have the form $s_1(t)=A_1 \cdot \exp(j \cdot 2 \pi \cdot f_1 \cdot t)$ and $s_2(t)=A_2 \cdot \exp(j \cdot 2\pi f_2 \cdot t)$, where $A_1$ and $A_2$ denote the signal amplitudes and $\exp(\bullet)$ denotes the natural exponential function. In the case of a digital implementation of the signal sources SQ1 and SQ2, these may each have two analog-to-digital converters 113a, 113a' and 113b, 113b' (or each have one analog-to-digital converter with two channels) in order to convert both the digital in-phase signal components $s_{11}[n]$ and $s_{12}[n]$ and the digital quadrature signal components $s_{Q1}[n]$ and $s_{Q2}[n]$ into analog signals. Analog and digital signal generators, which are embodied to generate complex-valued single-tone signals are known per se and are therefore not explained in any more detail here.

In one implementation with complex-valued single-tone signals $s_1(t)$ and $s_2(t)$, the associated modulators 111a and 111b can be embodied as IQ modulators. IQ modulators (IQM) are known per se and are therefore not explained in any more detail here. IQ modulators are also known by different names, such as, e.g., quadrature modulators, quadrature upconverters, Cartesian upconverters, etc. In essence, the IQ modulators bring about a single-sideband modulation of the LO signal $s_{LO}(t)$. As in the preceding example from FIG. 7, the output signals $s_{RF1}(t)$ and $s_{RF2}(t)$ of the modulators 111a and 111b are combined by means of an RF combiner circuit 114, which, once again, may be embodied as a Wilkinson power combiner. In this case, the output signal $s_{RFTEST}(t)$ of the RF combiner circuit 114 is a linear combination of the RF signals $s_{RF1}(t)$ and $s_{RF2}(t)$. Since (complex-valued) single-tone signals are fed to the IQ modulators 111a and 111b as modulation signals, only higher harmonics, but no IMPs, arise. The combined signal $s_{RFTEST}(t)$ does not contain any IMPs either.

Figure 9:
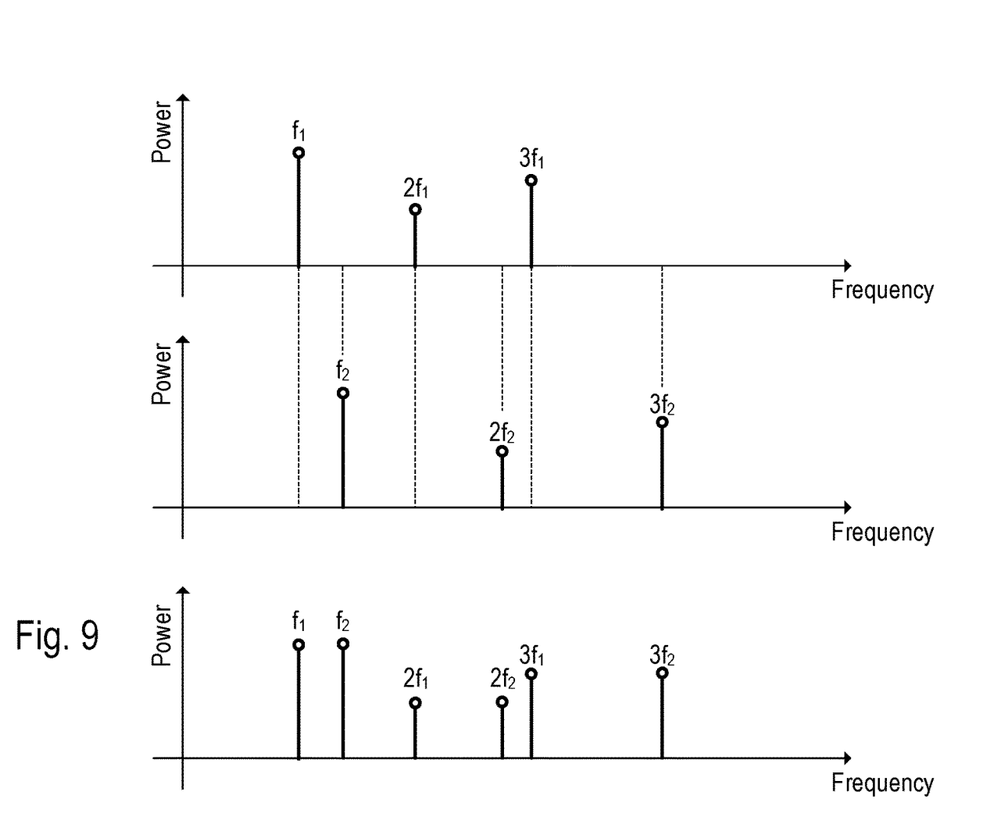
FIG. 9 illustrates spectra of single-tone signals and two-tone signals, which may occur as test signals in the examples of FIG. 7 or 8, as an example.

As mentioned, the separate modulation of the RF oscillator signal $s_{LO}(t)$ with two or more single-tone signals and the subsequent (linear) combination of the modulated RF signals has the effect that no IMPs are present in the RF test signal $s_{RFTEST}(t)$. Therefore, it is possible to uniquely ascribe IMPs which are determined in the spectrum of the output signal $y[n]$ of a receive channel (see FIG. 5; RX channel RX01) to the respective receiver circuit of the receive channel. These circumstances are illustrated as an example in the spectra illustrated in FIG. 9. The third (bottom) diagram shows the spectrum of the output signal $y[n]$ of an RX channel in the (theoretical) case of a perfect linearity in the receiver circuit such that no IMPs occur. The higher harmonics already arise from harmonic distortions in the modulators 111a and 111b of the test signal generator circuit TSG. Unlike in the case illustrated in FIG. 6, no IMPs are generated in the test signal generator circuit TSG because a separate modulator is provided for each single-tone signal. The first (top) diagram in FIG. 9 shows that part of the spectrum that can be traced back to the first single-tone signal $s_1(t)$ at the frequency $f_1$; the second (middle)

diagram in FIG. 9 shows that part of the spectrum that can be traced back to the second single-tone signal $s_2(t)$ at the frequency $f_2$.

If IMPs were now to occur in the spectrum of the output signal y[n] of an RX channel (see bottom diagram in FIG. 9), these could be uniquely ascribed to a nonlinearity in the receiver circuit of the respective RX channel, as a result of which a quantitative measurement of the linearity of the receiver circuit is facilitated. Since the RF test signal contains no spectral lines (that are displaced by the frequency $f_{LO}$ on account of the modulation) at the frequencies $k \cdot f_1 + l \cdot f_2$ for $k \neq 0$ and $l \neq 0$ (k and l are integers)—i.e., no IMPs—possibly occurring IMPs have to be generated by a nonlinearity in the receiver circuit, for example in the receive mixer 104. In general terms, spectral lines (e.g., on account of IMPs) in the spectrum of the output signal y[n] of an RX channel that have no correspondence (i.e., no corresponding spectral line) in the RF test signal $s_{RFTEST}(t)$ originate from nonlinearities in the receiver circuit of the relevant channel.

Figure 10:
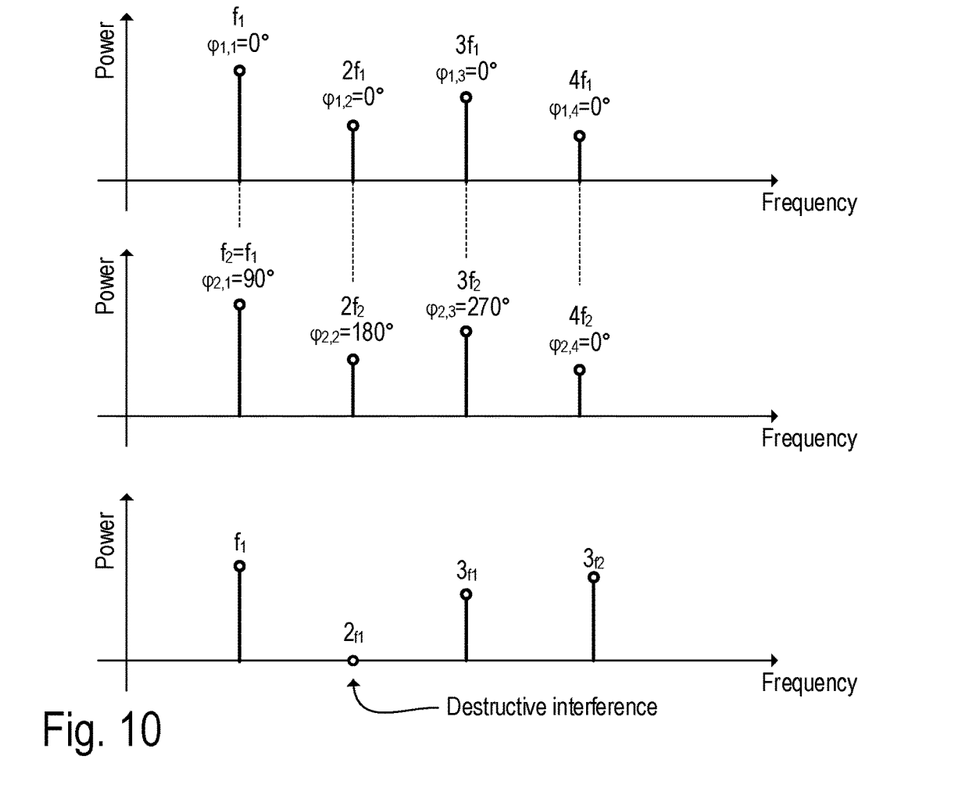
FIG. 10 illustrates spectra of single-tone signals with different phases, which may occur as test signals in the examples of FIG. 7 or 8, as an example.

On the basis of the arising spectra, FIG. 10 illustrates a further alternative for generating an RF test signal, which can be used in the examples of FIGS. 7 and 8. Like in the preceding example of FIG. 9, the first (top) diagram of FIG. 10 shows that part of the signal that can be traced back to the first single-tone signal $s_1(t)$ at the frequency $f_1$ and the second (middle) diagram in FIG. 10 shows that part of the spectrum that can be traced back to the second single-tone signal $s_2(t)$ at the frequency $f_2$. The third (bottom) diagram in FIG. 10 shows the spectrum of the output signal y[n] of an RX channel in the (theoretical) case of a perfect linearity of the receiver circuit such that no IMPs occur.

Unlike in the preceding case, the two frequencies $f_1$ and $f_2$ are equal ($f_1 = f_2$) in the illustrated example. However, the two single-tone signals $s_1(t)$ and $s_2(t)$ differ in terms of the phase, with the phase difference $\varphi_{2,1} - \varphi_{1,1}$ of the fundamental mode being 90° (i.e., $\pi/2$) or an odd multiple thereof. In the illustrated example, the phase $\varphi_{1,1}$ of the first signal $s_1(t)$ is 0° and the phase $\varphi_{2,1}$ of the second signal $s_2(t)$ is 90°. The phases $\varphi_{2,2}$, $\varphi_{2,3}$, etc., of the higher harmonics $2 \cdot f_2$, $3 \cdot f_2$, etc., which are generated in the modulators 111a, 111b, are multiplied accordingly. Accordingly, the phase of the first harmonics $2 \cdot f_2$ ($= 2 \cdot f_1$) is 180°, which is why destructive interference arises in the case of a superposition in the RF combiner circuit 114 (see FIG. 7 or 8). In the present example, the resultant RF test signal $s_{RFTEST}(t)$ is not a two-tone signal but a single-tone signal at the frequency $f_1 = f_2$; however, the use of two separate modulators ensures that the second harmonic at the frequency $2 \cdot f_2$ is canceled in the RF test signal $s_{RFTEST}(t)$.

Should a spectral line nevertheless occur at the frequency $2 \cdot f_1$ in the spectrum of the output signal y[n] of an RX channel (see bottom diagram in FIG. 10), this spectral line could be uniquely ascribed to a nonlinearity in the receiver circuit of the respective RX channel. In this case, too, a quantitative measurement of the linearity in the receiver circuit is possible since the signal power of the first harmonics can be used as a measure for the linearity or nonlinearity of the receiver circuit of the relevant channel as the spectral line at the frequency $2 \cdot f_1$ has no correspondence (i.e., no corresponding spectral line) in the RF test signal $s_{RFTEST}(t)$.

Figure 11:
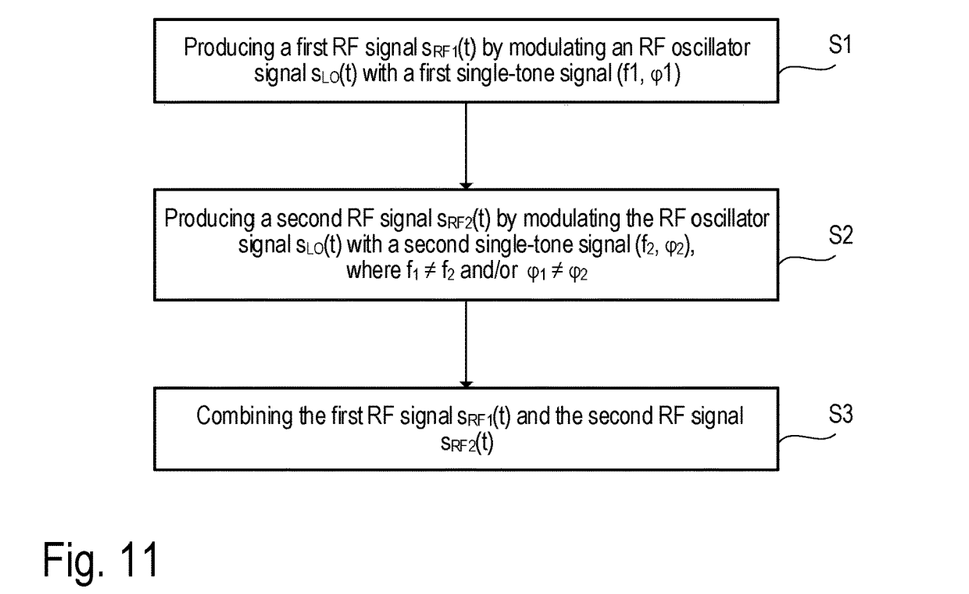
FIG. 11 is a flowchart for illustrating an example embodiment of a method for generating an RF test signal and for testing an RF receive circuit.
Figure 12:
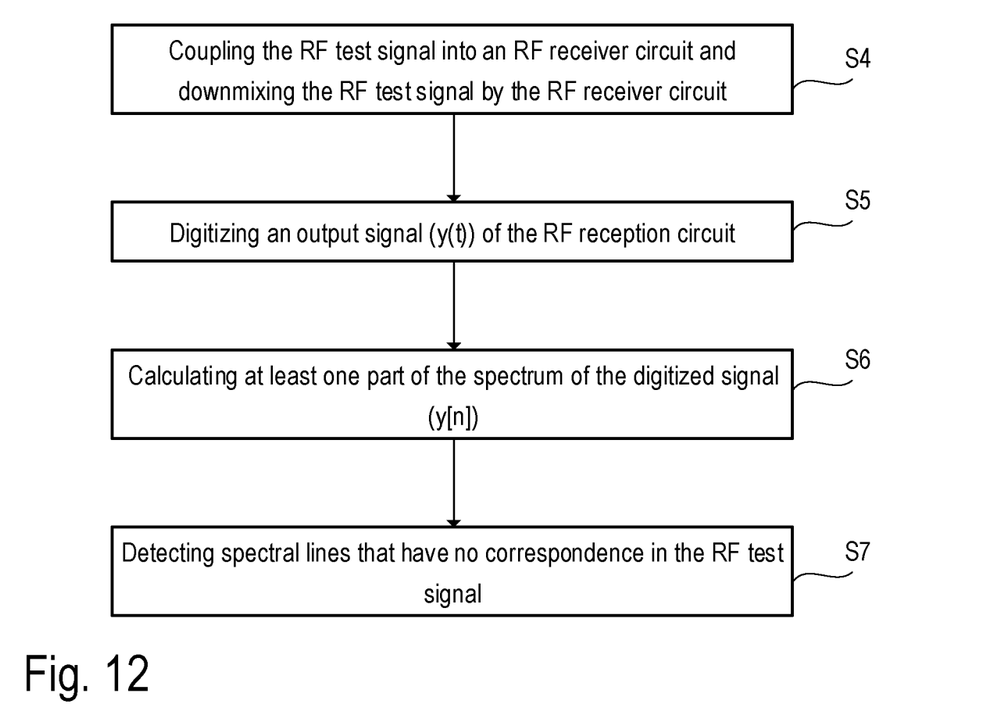
FIG. 12 is a flowchart for illustrating an example embodiment of a method for quantitative testing of an RF receive circuit with an RF test signal.

FIGS. 11 and 12 show a flowchart illustrating an example of a method for generating a high-quality RF test signal (i.e., substantially without noteworthy IMPs) in an MMIC for testing one or more receiver circuits of one or more RX channels of the MMIC. FIG. 11 illustrates the generation of the test signal and FIG. 12 illustrates the test of the receiver circuit integrated in the MMIC. In the illustrated example, the method includes (step S1) generating a first RF signal (see, e.g., FIG. 7; RF signal $s_{RF1}(t)$) by modulating an RF oscillator signal (see, e.g., FIGS. 5 and 7; LO signal $s_{LO}(t)$) with a first single-tone signal (see, e.g., FIG. 7; signal $s_1(t)$ with frequency $f_1$ and phase $\varphi_1$) and (step S2) generating a second RF signal (see, e.g., FIG. 7; RF signal $s_{REF2}(t)$) by modulating the RF oscillator signal with a second single-tone signal (see, e.g., FIG. 7; signal $s_2(t)$ with frequency $f_2$ and phase $\varphi_2$). Here, the single-tone signals differ in terms of their frequency or in terms of their phase or in both ($f_1 \neq f_2$ and/or $\varphi_1 \neq \varphi_2$). An RF test signal (see, e.g., FIG. 7; RF test signal $s_{RFTEST}(t)$) is generated (step S3) by combining the first RF signal and the second RF signal, as a result of which the creation of IMPs is largely prevented.

As mentioned, the two single-tone signals can be generated by signal sources integrated in the MMIC (see FIGS. 7 and 8; signal sources SQ1 and SQ2) or can be generated in an external test device and fed into the MMIC. Then, the RF test signal is fed into the receiver circuit, for example by way of coupler, in such a way that it is fed to the RF input of the receive mixer (see, e.g., FIG. 5; coupler 110, receive mixer 104). The receive mixer effects a downmixing of the RF test signal into the baseband (see FIG. 12; step S4). The baseband signal (which has been processed further in analog, for example) can be considered to be the output signal of the receiver circuit (see FIG. 5; signal y(t)); this output signal is digitized (see FIG. 5; digital output signal y[n]), facilitating further digital processing (see FIG. 12; step S5). The further digital processing consists of a spectral analysis of the digitized signal, with at least part of the spectrum being calculated (e.g., a power density spectrum). Finally, those spectral lines that have no correspondence (i.e., no corresponding spectral line) in the RF test signal can be detected in the spectrum. These detected spectral lines can be assigned to a nonlinearity in the receiver circuit. The power of these spectral lines can also be used as a measure for the linearity of the receiver circuit, in particular of the receive mixer, with the linearity being higher, with lower power or smaller amplitude of the detected spectral lines that have no correspondence in the RF test signal.

The invention claimed is:

1. A circuit, comprising:
    an input circuit node to receive a radiofrequency (RF) oscillator signal;
    a first modulator to generate a first RF signal by virtue of the RF oscillator signal being modulated with a first signal;
    a second modulator to generate a second RF signal by virtue of the RF oscillator signal being modulated with a second signal;
    an RF combiner circuit to generate an RF test signal by combining the first RF signal and the second RF signal;
    an RF receive circuit to:
        receive the RF test signal, and
        generate a digital signal based on the RF test signal; and
    a processor to provide information items relating to a linearity of the RF receive circuit on a basis of a spectrum of the digital signal.

2. The circuit of claim 1, wherein the first signal and the second signal are single-tone signals that differ in terms of their frequency and/or in terms of their phase.

3. The circuit of claim 1, further comprising:
    a signal source to generate the first signal and the second signal,
        wherein the first signal and the second signal each having a single frequency and one phase.

4. The circuit of claim 3, wherein the signal source comprises:
   a first digital signal generator and a downstream first digital/analog converter to provide the first signal as an output signal; and
   a second digital signal generator and a downstream second digital/analog converter to provide the second signal as an output signal.

5. The circuit of claim 1, wherein the first signal and the second signal are each complex-valued signals, and are each represented by an in-phase signal component and a quadrature signal component, and
   wherein the first modulator and the second modulator are IQ modulators.

6. The circuit of claim 1, wherein the RF receive circuit comprises a receive mixer and a coupler disposed upstream of the receive mixer,
   the coupler being configured to:
      receive the RF test signal, and
      transmit the RF test signal to an RF input of the receive mixer.

7. The circuit of claim 6, wherein the RF receive circuit further comprises:
   an analog/digital converter coupled to an output of the receive mixer and configured to:
   digitize an output signal of the receive mixer, and
   generate the digital signal.

8. The circuit of claim 7, wherein the processor is coupled to the analog/digital converter and configured to calculate at least part of the spectrum of the digital signal.

9. The circuit of claim 6, wherein the RF receive circuit further comprises:
   an RF amplifier connected between the coupler and the receive mixer,
      wherein the information items relating to the linearity of the RF receive circuit comprise information items about a linearity of a combination of the RF amplifier and the receive mixer.

10. The circuit of claim 1, wherein the information items relating to the linearity of the RF receive circuit comprise information items about spectral lines of the digital signal, the spectral lines having no correspondence in the RF test signal.

11. The circuit of claim 1, wherein the first RF signal comprises spectral lines that correspond to an integer multiple of a frequency of the first signal and which are displaced by a frequency of the RF oscillator signal,
   wherein the second RF signal comprises spectral lines that correspond to an integer multiple of a frequency of the second signal and which are displaced by the frequency of the RF oscillator signal, and
   wherein the first RF signal and the second RF signal have no spectral lines that correspond to sums and/or differences of integer multiples of the frequency of the first signal and the frequency of the second signal and that are shifted by the frequency of the RF oscillator signal.

12. A method, comprising:
   generating a first radiofrequency (RF) signal by modulating an RF oscillator signal with a first signal;
   generating a second RF signal by modulating the RF oscillator signal with a second signal;
   generating an RF test signal by combining the first RF signal and the second RF signal;
   coupling the RF test signal into an RF receive circuit;
   digitizing an output signal of the RF receive circuit; and
   providing information items relating to a linearity of the RF receive circuit on a basis of a spectrum of the digitized output signal.

13. The method of claim 12, wherein the first signal and the second signal are single-tone signals that differ in terms of their frequency and/or in terms of their phase.

14. The method of claim 13, wherein the first signal and the second signal are each generated as complex-valued signals that are each represented by an in-phase signal component and a quadrature signal component, and
   wherein modulation of the RF oscillator signal is performed using IQ modulators.

15. The method of claim 12, wherein coupling the RF test signal into an RF receive circuit comprises:
   coupling the RF test signal into an input of a receive mixer of the RF receive circuit.

16. The method of claim 15, further comprising:
   calculating at least part of a spectrum of the digitized output signal.

17. The method of claim 12, wherein the information items relating to the linearity of the RF receive circuit comprise information items about spectral lines of the digitized output signal that have no correspondence in the RF test signal.

18. A radiofrequency (RF) apparatus, comprising:
   an antenna input to connect an antenna;
   an RF signal source to provide an RF oscillator signal;
   a receive mixer comprising an RF input and an output;
   a coupler connected to the antenna input; and
   a circuit comprising:
      an input circuit node coupled with the RF signal source to receive the RF oscillator signal;
      a first modulator to generate a first RF signal by modulating the RF oscillator signal with a first signal;
      a second modulator to generate a second RF signal by modulating the RF oscillator signal with a second signal;
      an RF combiner circuit to:
         generate an RF test signal by combining the first RF signal and the second RF signal, and
         transmit the RF test signal to the RF input; and
      a processor to provide information items relating to a linearity of an RF receive circuit on a basis of a spectrum of a digital signal based on the output.

19. The RF apparatus of claim 18, wherein the first signal and the second signal are single-tone signals that differ in terms of their frequency and/or in terms of their phase.

20. The RF apparatus of claim 18, wherein the RF combiner circuit, when generating the RF test signal, is to:
   generate the RF test signal by providing a linear combination of the first RF signal and the second RF signal.

21. A method, comprising:
   producing a radiofrequency (RF) test signal by modulating a plurality of modulation signals onto an RF signal, the plurality of modulation signals differing pairwise in terms of their phase or pairwise in terms of their frequency;
   feeding the RF test signal into at least one RF circuit;
   digitizing an output signal of the at least one RF circuit; and
   providing information items relating to a linearity of the at least one RF circuit on a basis of a spectrum of the digitized output signal.

22. A circuit, comprising:
   an input circuit node to receive a radiofrequency (RF) oscillator signal;

a test signal generator circuit comprising at least one modulator and configured to generate an RF test signal by modulating the RF oscillator signal;

at least one receive channel comprising:
   a receiver circuit, and
   a coupler configured to feed the RF test signal into the receiver circuit;

an analog/digital converter coupled to the receiver circuit and configured to generate a digital signal based on digitizing an output signal of the receiver circuit; and a processor coupled to the analog/digital converter and configured to provide information items relating to a linearity of the at least one receive channel on a basis of a spectrum of the digital signal.

23. The circuit of claim 22, wherein the test signal generator circuit comprises:
   at least two modulators, and
   an RF combiner circuit that is coupled to outputs of the at least two modulators.

24. The circuit of claim 23, wherein the RF combiner circuit comprises a Wilkinson power combiner.

* * * * *